B. BAKEWELL, Jr.
Manufacture of Glass-Ware.
No. 155,403. Patented Sept. 29, 1874.
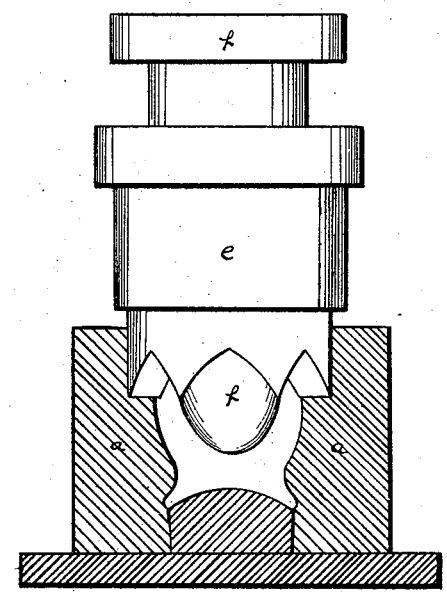
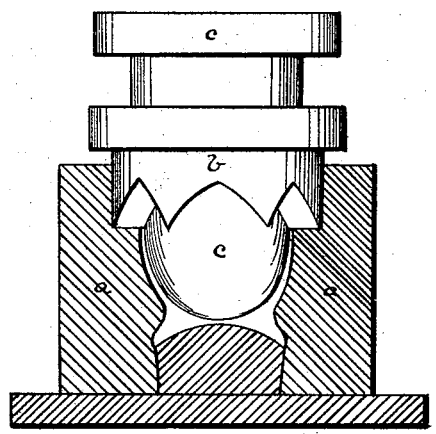
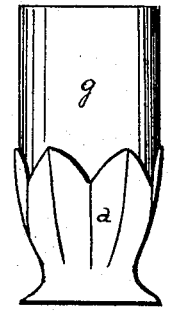

UNITED STATES PATENT OFFICE.

BENJAMIN BAKEWELL, JR., OF PITTSBURG, PENNSYLVANIA.

IMPROVEMENT IN THE MANUFACTURE OF GLASSWARE.

Specification forming part of Letters Patent No. 155,403, dated September 29, 1874; application filed July 18, 1874.

*To all whom it may concern:*

Be it known that I, BENJAMIN BAKEWELL, Jr., of Pittsburg, in the county of Allegheny and State of Pennsylvania, have invented a new and useful Improvement in Manufacture of Glassware; and I do hereby declare the following to be a full, clear, and exact description thereof, reference being had to the accompanying drawing forming a part of this specification, in which—

Figure 1 is a vertical section of the mold and the plunger and ring first used therewith. Fig. 2 is a like view of the mold with the second plunger and ring used therewith, and Fig. 3 is a view of the article formed by the mold and plungers shown.

Like letters of reference indicate like parts in each.

My invention consists in the manufacture of glass articles by pressing glass of different colors, one upon or above another, in a mold or molds, so as to form an article made up of two or more colors.

To enable others skilled in the art to practice my invention, I will now describe it.

The manner of carrying out this invention, which is illustrated by the accompanying drawing, is probably the simplest way of doing so. In this example I make use of the two-part mold *a*, which is of the ordinary construction. The ring *b*, of the usual construction, is then placed on the mold *a*. The molten glass, which constitutes the base-color of the article to be made, is placed in the mold, and pressed into shape by means of the plunger *c*. This portion of the article is indicated at *d*. The ring *b* and plunger *c* are then removed, and the large ring *e* is placed upon the top of the mold *a*, and molten glass, either colorless or of another color, is placed in the mold, and pressed into shape by the plunger *f*. The second portion of the article, which is formed by the second operation, is indicated at *g*.

Articles of three or more colors may be made in like manner by interchange-plungers and rings, and by varying the inner configuration of the mold articles of various shapes and great beauty may be produced.

The glass which is first placed in the mold must be at welding heat during the subsequent operations, or the two will not unite so as to produce a perfect union.

Various other methods might be suggested for carrying out my invention. If desired, the base portion may be removed from the mold, reheated, placed in a suitable frame, and the other portion formed thereon. This is especially applicable to stemmed ware.

The second or third portion of glass which is added may extend down into the next one below, so as to form a joint around its entire surface, or the weld may be formed along the upper edge.

I am aware that bas-relief glass-work has been united to the outer surface of blown glassware by first pressing articles of bas-relief, and then blowing a glass article so as to unite therewith, and do not claim such a process; but

What I claim as my invention, and desire to secure by Letters Patent, is—

As an improvement in the method of forming glass articles of two or more colors, pressing one color upon another successively by means of interchangeable plungers and rings or molds, substantially as and for the purpose specified.

In testimony whereof I, the said BENJAMIN BAKEWELL, Jr., have hereunto set my hand.

BENJAMIN BAKEWELL, JR.

Witnesses:
W. N. PAXTON,
JAMES I. KAY.